(12) United States Patent
Kim et al.

(10) Patent No.: US 8,432,512 B2
(45) Date of Patent: Apr. 30, 2013

(54) BACKLIGHT ASSEMBLY AND DISPLAY DEVICE HAVING THE SAME

(75) Inventors: Hwi Kim, Seoul (KR); Hee-Jin Choi, Seoul (KR); Hee-Seop Kim, Hwaseong-si (KR); Hae-Young Yun, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 647 days.

(21) Appl. No.: 12/696,876

(22) Filed: Jan. 29, 2010

(65) Prior Publication Data
US 2011/0051022 A1  Mar. 3, 2011

(30) Foreign Application Priority Data

Aug. 25, 2009 (KR) .................. 10-2009-0078790

(51) Int. Cl.
*G02F 1/1335* (2006.01)
(52) U.S. Cl.
USPC .......................................... 349/65
(58) Field of Classification Search .................. None
See application file for complete search history.

(56) References Cited

U.S. PATENT DOCUMENTS

| 5,603,068 | A | * | 2/1997 | Aihara | 396/287 |
|---|---|---|---|---|---|
| 6,086,212 | A | * | 7/2000 | Onishi et al. | 362/621 |
| 6,789,910 | B2 | * | 9/2004 | Kimura et al. | 362/600 |
| 6,842,204 | B1 | * | 1/2005 | Johnson | 349/74 |
| 2005/0200781 | A1 | * | 9/2005 | Takatani | 349/122 |

\* cited by examiner

*Primary Examiner* — Lucy Chien
(74) *Attorney, Agent, or Firm* — H.C. Park & Associates, PLC

(57) ABSTRACT

A backlight assembly includes a light source part, a total reflection plate and an array sheet. The light source part generates light. The total reflection plate totally internally reflects or transmits the light selectively according to an incident path of the light. The array sheet disposed on the total reflection plate includes a plurality of units having an incident surface making contact with the total reflection plate and an emitting surface facing the incident surface, refracts the totally internally reflected light at a contact surface between the incident surface and the total reflection plate to emit the refracted light, and emits the transmitted light as a non-refracted light. Accordingly, luminance of the display device is enhanced.

18 Claims, 9 Drawing Sheets

BACKLIGHT ASSEMBLY AND DISPLAY DEVICE HAVING THE SAME

CROSS REFERENCE TO RELATED APPLICATION

This application claims priority from and the benefit of Korean Patent Application No. 2009-78790, filed on Aug. 25, 2009, which is hereby incorporated by reference for all purposes as if fully set forth herein.

BACKGROUND OF THE INVENTION

1. Field of the Invention

Exemplary embodiments of the present invention relate to a backlight assembly and a display device having the backlight assembly. More particularly, the present invention relates to a backlight assembly having a barrier type to display a three-dimensional image and a display device having the backlight assembly.

2. Discussion of the Background

Generally, a three-dimensional (3D) image display device displays a 3D image by applying a different two-dimensional (2D) image to each eye of an observer. For example, the observer sees a pair of 2D images through his/her left and right eyes, fuses the 2D images in the brain, recognizes a 3D effect, and then the observer can see the 3D image. Auto stereo-scopic 3D image display devices, such as a barrier type using a parallax barrier and a lenticular type using a lens, are generally used.

However, a large amount of light may be blocked by the parallax barrier in the barrier type, so that the barrier type may have a luminance that is less than that of the lenticular type.

In addition, the observer cannot see the 2D image in the 3D image display device, because the 3D image display devices have the parallax barrier or the lens in front of a display panel displaying the 2D image. Therefore, it is impossible for the observer to see the 2D image unless the parallax barrier or the lens is removed. 2D/3D switchable display devices capable of selecting a 2D mode displaying the 2D image or a 3D mode displaying the 3D image in one display device have been developed. In the 2D/3D switchable display devices, the light is provided to the display panel by dividing the display panel into a plurality of portions when displaying the 3D image, and the light is uniformly provided to all over the display panel when displaying the 2D image.

In the 2D/3D switchable display devices, due to a demand for controlling the light, a luminance of the 3D mode may be less than that of the 2D mode. Therefore, the number of light sources may be increased to solve the problem. However, to improve the luminance of the 3D mode via increasing the number of the light sources may be difficult due to a structural limitation of the light sources.

SUMMARY OF THE INVENTION

Exemplary embodiments of the present invention provide a backlight assembly to enhance luminance efficiency.

Exemplary embodiments of the present invention also provide a display device having the above-mentioned backlight assembly.

Additional features of the invention will be set forth in the description which follows, and in part will be apparent from the description, or may be learned by practice of the invention.

An exemplary embodiment of the present invention discloses a backlight assembly that includes a light source part, a total reflection plate, and an array sheet. The light source part generates light. The total reflection plate totally internally reflects or transmits the light selectively according to an incident path of the light. The array sheet that is disposed on the total reflection plate includes a plurality of units each having an incident surface making contact with the total reflection plate and an emitting surface facing the incident surface, each of the units refracts the totally internally reflected light at a contact surface between the incident surface and the total reflection plate to emit the refracted light, and emits the transmitted light as a non-refracted light.

An exemplary embodiment of the present invention also discloses a display device including a display panel, a total reflection plate, and an array sheet. The display panel includes a plurality of pixel cells. The total reflection plate is disposed under the display panel, and totally internally reflects or transmits the light selectively according to an incident path of the light. The array sheet that is disposed on the total reflection plate includes a plurality of units each having an incident surface making contact with the total reflection plate and an emitting surface facing the incident surface, each of the units refracts the totally internally reflected light at a contact surface between the incident surface and the total reflection plate to emit the refracted light, and emits the transmitted light as a non-refracted light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
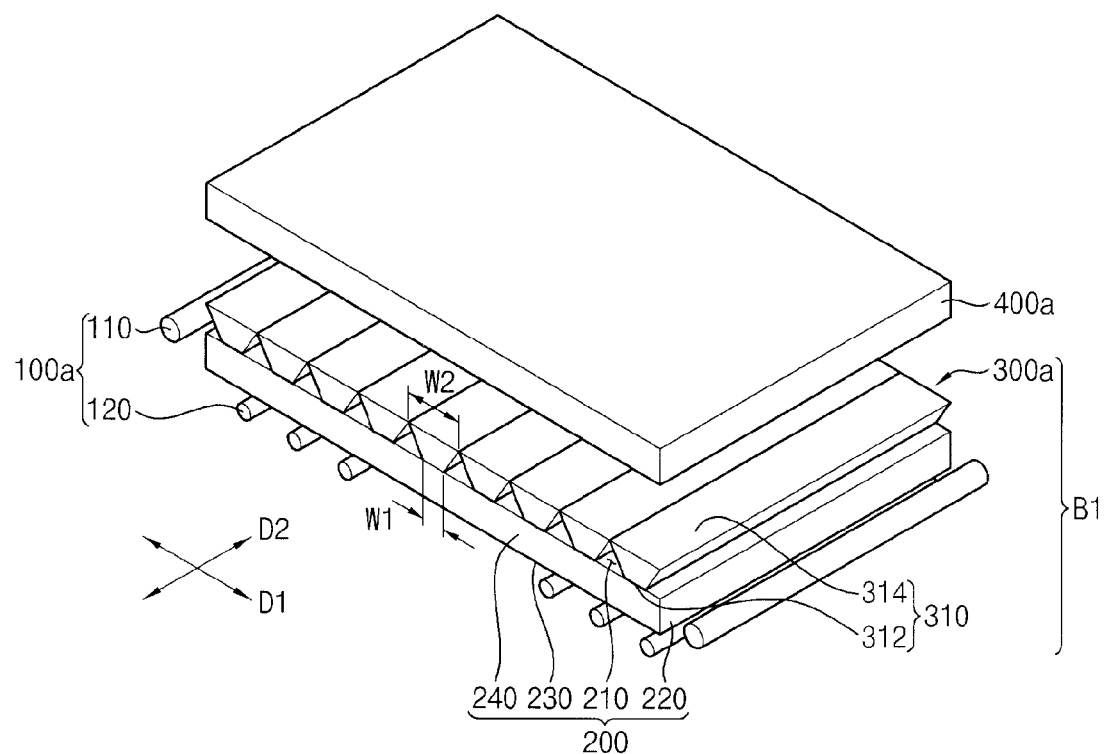
FIG. 1 is an exploded perspective view illustrating a display device according to an exemplary embodiment of the present invention.

The invention is described more fully hereinafter with reference to the accompanying drawings, in which exemplary embodiments of the present invention are shown. This invention may, however, be embodied in many different forms and should not be construed as limited to the embodiments set forth herein. Rather, these embodiments are provided so that this disclosure is thorough, and will fully convey the scope of the present invention to those skilled in the art. In the drawings, the size and relative sizes of layers and regions may be exaggerated for clarity. Like reference numerals in the drawings denote like elements.

It will be understood that when an element or layer is referred to as being "on," "connected to" or "coupled to" another element or layer, it can be directly on, directly connected to or directly coupled to the other element or layer, or intervening elements or layers may be present. In contrast, when an element or layer is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

FIG. 1 is an exploded perspective view illustrating a display device according to an exemplary embodiment of the present invention.

The display device according to the present exemplary embodiment includes a backlight assembly B1 including a light source part 100a, a total reflection plate 200 and an array sheet 300a, and a display panel 400a.

The light source part 100a generates light and provides the light to the total reflection plate 200. The light source part 100a includes a first light source 110 disposed as an edge illumination type with respect to the total reflection plate 200 and a second light source 120 disposed as a direct illumination type with respect to the total reflection plate 200.

The total reflection plate 200 includes an upper surface 210 facing the array sheet 300a, a lower surface 230 opposite to the upper surface 210, and first side surfaces 220 and second side surfaces 240 connecting the upper surface 210 to the lower surface 230. The first side surfaces 220 are opposite to each other in a first direction D1 and the second side surfaces 240 are opposite to each other in a second direction D2 different from the first direction D1. In the present exemplary embodiment, the first direction D1 is substantially perpendicular to the second direction D2.

The first light source 110 is disposed to face at least one of the first side surfaces 220. The first light source 110 may include linear lamps respectively disposed at the first side surfaces 220 as illustrated in FIG. 1. Alternatively, the first light source 110 may be disposed to face one of the second side surfaces 240. The first light source 110 may be selectively disposed adjacent to at least one of the second side surfaces 240.

The second light source 120 is disposed to face the lower surface 230. The second light source 120 may include linear lamps disposed substantially parallel with one another along the first direction D1 all over the lower surface 230. Alternatively, the linear lamps of the second light source 120 may be disposed substantially parallel with one another along the second direction D2.

The total reflection plate 200 totally reflects the light provided from the first light source 110 inside of the total reflection plate 200. The total reflection plate 200 totally reflects the light entering through the first side surfaces 220 inside of the total reflection plate 200, and does not emit the light outside of the total reflection plate 200, independently. Hereinafter, the light that is totally reflected inside of the total reflection plate 200 is defined as total reflection light L1 (refer to FIG. 3A).

However, the total reflection plate 200 emits the light provided from the second light source 120 to outside of the total reflection plate 200 through the upper surface 210. The total reflection plate 200 emits the light incident through the lower surface 230 to outside of the total reflection plate 200 through the upper surface 210, independently. Hereinafter, the light provided from the second light source 120 and transmitted by the total reflection plate 200 is defined as transmitted light L3 (refer to FIG. 3B).

The array sheet 300a is disposed on the total reflection plate 200. The array sheet 300a includes a transparent material capable of transmitting the light. The array sheet 300a includes a plurality of units 310 determining a path of the light provided from the light source part 100a. Each of the units 310 is extended along the second direction D2 and is disposed substantially parallel with one another in the first direction D1. For example, each of the units 310 may have an inverse prism shape having a chamfered vertex. Each of the units 310 includes an incident surface 312 making direct contact with the upper surface 210 and an emitting surface 314 facing the incident surface 312. In the inverse prism shape, the chamfered vertex corresponds to the incident surface 312. An area of the emitting surface 314 is greater than that of the incident surface 312. Each of the incident surface 312 and the emitting surface 314 has a rectangular shape that is defined as a pair of first sides extended in the first direction D1 and a pair of second sides extended in the second direction D2. For example, the first sides may be shorter sides and the second sides may be longer sides. A cross-sectional surface taken of each of the units 310 along the first direction D1 has a trapezoid shape, that is, a length of the first side of the emitting surface 314 is greater than a length of the first side of the incident surface 312. The incident surfaces 312 adjacent to each other are spaced apart from each other by a predetermined distance.

The area of the emitting surface 314 is greater than that of the incident surface 312. A first width w1 of the first side extended in the first direction D1 of the incident surface 312 is less than the second width w2 of the first side extended in the first direction D1 of the emitting surface 314. The sum of areas of the emitting surfaces 314 of the plurality of units 310 may be substantially the same as the area of the display panel 400a.

Each of the units 310 provides refracted light L2 (refer to FIG. 3A) that is refracted from the total reflection light L1 at a contact surface CNT where the upper surface 210 makes contact with the incident surface 312 (refer to FIG. 3A), to the emitting surface 314. At the contact surface CNT, the total reflection light L1 makes contact with the array sheet 300a that is a different medium from the total reflection plate 200 so that the total reflection light L1 is refracted. A path of the refracted light L2 is determined according to a refraction angle of the total reflection light L1 at the contact surface CNT. Therefore, the array sheet 300a may be a parallax barrier of a barrier type by determining the path of the total reflection light L1 at each of the units 310. The array sheet 300a includes the transparent material, so that light transmissivity may be improved even though the array sheet 300a becomes the parallax barrier of the barrier type.

In addition, each of the units 310 receives the transmitted light L3 and emits the transmitted light L3 to the emitting surface 314. Hereinafter, the transmitted light L3 that is not refracted and/or reflected by the units 310 and is emitted to the emitting surface 314 is defined as non-refracted light L4 (refer to FIG. 3B). For example, the light from the second light source 120 enters inside of the total reflection plate 200 at an incidence angle (for example, about 0°) that is smaller than a critical angle of the total reflection plate 200, even if the transmitted light L3 passes through the total reflection plate 200 and the array sheet 300a. Therefore, the transmitted light L3 is not refracted and/or reflected in the total reflection plate 200, so that the path of the transmitted light L3 is not changed and the transmitted light L3 is emitted as the non-refracted light L4.

The display panel 400a is disposed over the array sheet 300a. The display panel 400a receives the refracted light L2 or the non-refracted light L4. The display panel 400a displays a two-dimensional image (hereinafter, 2D image), but an observer may see the 2D image as it is or a three-dimensional image (hereinafter, 3D image) that is converted from the 2D image according to a lighting and a blackout of the first light source 110 and the second light source 120. For example, when the first light source 110 is turned on, the 3D image may be displayed. Whereas, when the second light source 120 is turned on, the 2D image may be displayed.

A path of the light from the light source part 100a to the display panel 400a through the total reflection plate 200 and the array sheet 300a will be described later in detail with reference to FIG. 3A and FIG. 3B.

Figure 2:
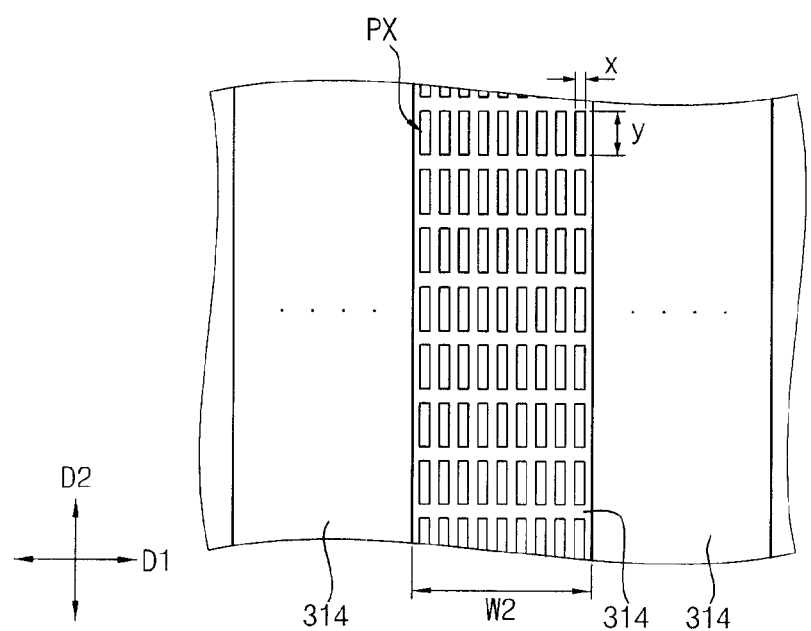
FIG. 2 is a plan view illustrating an arrangement relation between the display panel and the array sheet of FIG. 1.

FIG. 2 is a plan view illustrating an arrangement relation between the display panel 400a and the array sheet 300a of FIG. 1.

Referring to FIG. 1 and FIG. 2, the display panel 400a according to the present exemplary embodiment includes a plurality of pixel cells PX. Each of the pixel cells PX may include a liquid crystal as a display element. The pixel cells PX are disposed in a matrix shape along the first direction D1 and the second direction D2. Each of the pixel cells PX includes a shorter side having a first length x extended in the first direction D1 and a longer side having a second length y extended in the second direction D2. Each of the pixel cells PX has a substantially rectangular shape. Each of the pixel cells PX may display red, green and blue colors.

The emitting surface 314 of each of the units 310 is disposed corresponding to at least two pixel cells PX adjacent to each other. For example, each of the units 310 may be disposed corresponding to nine pixel cells PX arranged in the first direction D1. For example, the second width w2 of the emitting surface 314 may be substantially the same as the multiplication of the number of the pixel cells PX by the first length x of each pixel cell PX. For example, the second width w2 may be from about 200 μm to about 300 μm. A length along the second direction D2 of the emitting surface 314 may be substantially the same as the multiplication of the number of the pixel cells PX arranged in the second direction D2 by the second length y of each pixel cell PX.

The pixel cells PX have substantially the same result that divides a plurality of pixel gatherings by the units 310. The pixel cells PX may define the pixel gatherings of a rectangular shape extended in the second direction D2 according to a shape of the emitting surface 314 of the units 310. When the 2D image is displayed, each of the pixel cells PX determines a resolution of the 2D image. However, when the 3D image is displayed, each of the pixel gatherings determines a resolution of the 3D image. According to the exemplary embodiment of the present invention, the light may be provided to the pixel gatherings determining the resolution of the 3D image by using the array sheet 300a as the parallax barrier. Therefore, an amount of the light blocked by the parallax barrier is minimized, so that the luminance efficiency may be maximized in the barrier type. In addition, the light generated from the first light source 110 may be the total reflection light L1 inside of the total reflection plate 200 or may be the refracted light L2, so that the light generated from the first light source 110 may be mostly used to display the 3D image.

Figure 3A:
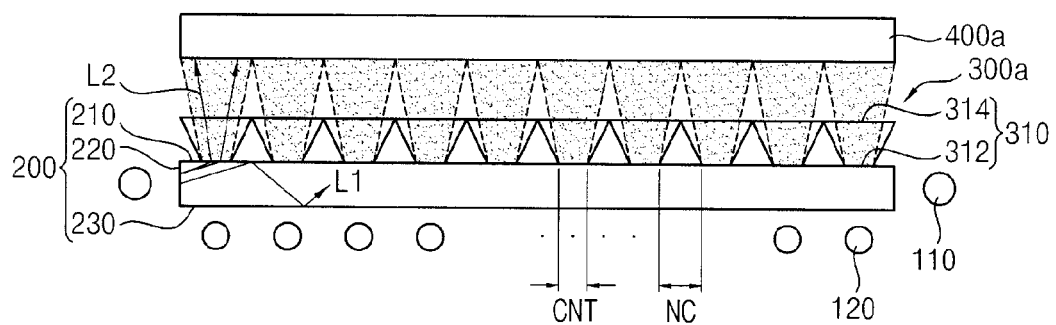
FIG. 3A is a cross-sectional view illustrating a 3D mode of the display device of FIG. 1

FIG. 3A is a cross-sectional view illustrating a three-dimensional image display mode (hereinafter, 3D mode) of the display device of FIG. 1. FIG. 3B is a cross-sectional view illustrating a two-dimensional image display mode (hereinafter, 2D mode) of the display device of FIG. 1.

Referring to FIG. 3A, in the 3D mode displaying the 3D image, a first voltage is applied to turn the first light source 110 on, and a second voltage is cut off to turn the second light source 120 off. The light generated from the first light source 110 enters inside of the total reflection plate 200 through the first side surface 220 to be the total reflection light L1.

Among the total reflection light L1, the total reflection light L1 proceeding to the contact surface CNT arrives at the contact surface CNT, is refracted at the contact surface CNT, and becomes the refracted light L2. The refracted light L2 is emitted toward the display panel 400a through the emitting surface 314. A path of the refracted light L2 is determined according to the refraction angle at the contact surface CNT. The total reflection light L1 may be refracted by different angles at the contact surface CNT, so that the path of the refracted light L2 may be also varied.

Among the total reflection light L1, the total reflection light L1 proceeding to a noncontact surface NC is reflected toward the lower surface 230 at the noncontact surface NC, and the upper surface 210 does not make contact with the incident surface 312. Therefore, the light generated from the first light source 110 is not emitted outside of the total reflection plate 200 until the light proceeds to the contact surface CNT from inside of the total reflection plate 200.

As described above, in the 3D mode, the total reflection light L1 inside of the total reflection plate 200 is refracted at the contact surface CNT and the refracted light L2 is emitted through the emitting surface 314. However, the total reflection light L1 is continually total-reflected between the noncontact surface NC and the lower surface 230, so that the total reflection light L1 is not emitted outside of the total reflection plate 200. Therefore, the display panel 400a receives the refracted light L2 having light paths diversified according to the refraction angle at the contact surface CNT, so that the observer may see the 3D image by a parallax of both eyes, even if the display panel 400a displays the 2D image.

Figure 3B:
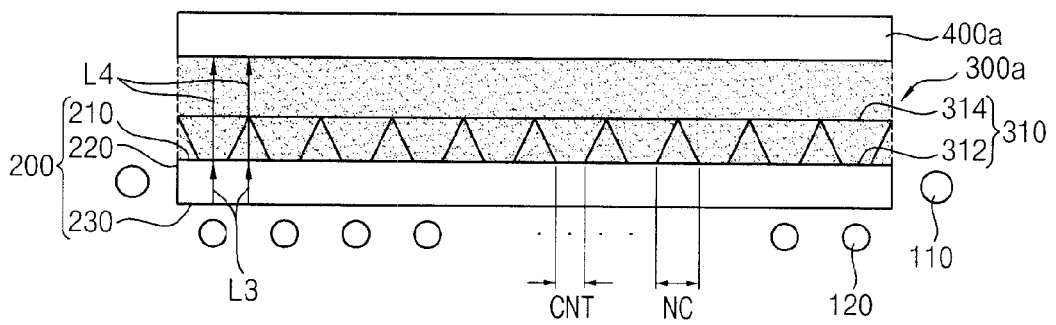
FIG. 3B is a cross-sectional view illustrating a 2D mode of the display device of FIG. 1.

Referring to FIG. 3B, in a 2D mode displaying the 2D image, the first voltage is cut off to turn the first light source 110 off, and the second voltage is applied to turn the second light source 120 on. The light generated from the second light source 120 enters inside of the total reflection plate 200 through the lower surface 230.

The light generated from the second light source 120 is mostly incident in a direction substantially perpendicular to the lower surface 230 and is transmitted inside of the total reflection plate 200. The transmitted light L3 passing through the total reflection plate 200 is not refracted and/or reflected at the noncontact surface NC as well as the contact surface CNT and is emitted as the non-refracted light L4. Therefore, the display panel 400a receives the non-refracted light L4 from the second light source 120 without reflection and/or refraction, so that the observer may see the 2D image displayed by the display panel 400a as it is, without distortion by the light.

As described above, the 3D mode illustrated in FIG. 3A and the 2D mode illustrated in FIG. 3B may be freely converted by just controlling the lighting and the blackout of the first light source 110 and the second light source 120. A controlling speed of the light source part 100a by the lighting and the blackout of the first light source 110 and the second light source 120 is faster than that of the liquid crystal by switching optical sheets when using the optical sheets having the liquid crystal. In addition, the barrier type may maintain a luminance level as great as that of the lenticular type by using the transparent array sheet 300a as the parallax barrier. In addition, the light generated from the first light source 110 may be totally reflected inside of the total reflection plate 200 to be the total reflection light L1 or may be refracted to the array sheet 300a to be the refracted light L2 from the total reflection light L1, so that the light generated from the first light source 110 may be mostly used to display the 3D image. Therefore, the luminance in displaying the 3D image may maintain substantially the same level as that in displaying the 2D image.

Figure 4:
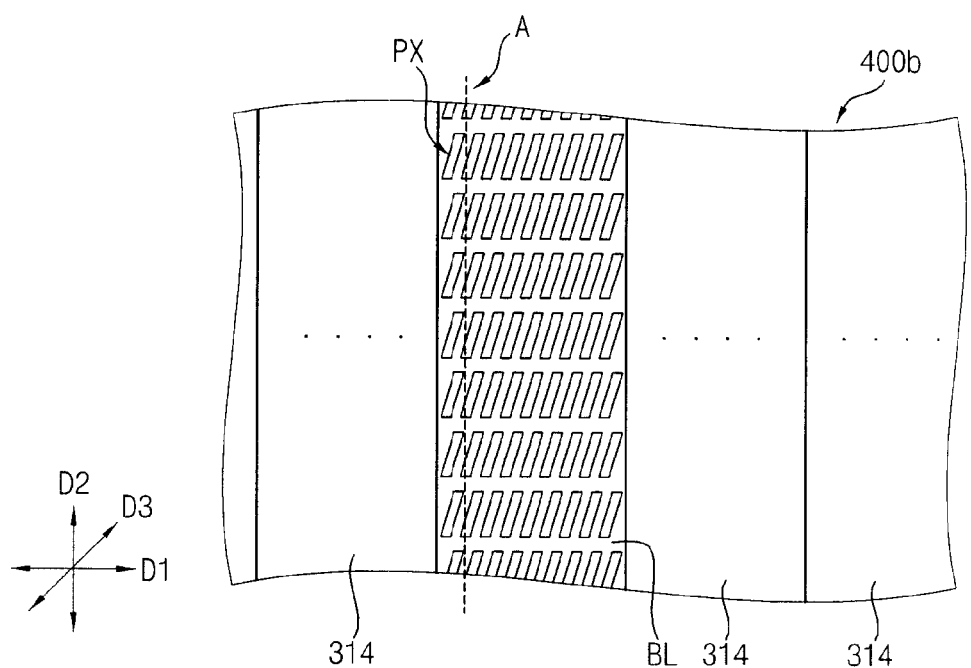
FIG. 4 is a plan view illustrating an arrangement relation between a display panel and an array sheet of a display device according to another exemplary embodiment of the present invention.

FIG. 4 is a plan view illustrating an arrangement relation between a display panel and an array sheet of a display device according to another exemplary embodiment of the present invention.

The display device according to the present exemplary embodiment is substantially the same as the previous exemplary embodiment in FIG. 1, except for the display panel 400b. Thus, the same reference numerals will be used to refer to the same or like parts as those described in the previous exemplary embodiment in FIG. 1 and any further repetitive explanation concerning the above elements will be omitted.

Each of the pixel cells PX of the display panel 400b illustrated in FIG. 4 includes a longer side extended along a third direction D3 that is between the first direction D1 and the second direction D2. When viewed on a plane, each of the pixel cells PX has a parallelogram shape by slanting the longer side along the third direction D3 with respect to the first direction D1. Each of the units 310 has the rectangular shape extended in the second direction D2 and each of the pixel cells PX has the parallelogram shape slanting to the third direction D3, so that a boundary of the emitting surface 314 of the units 310 may partially overlap with the pixel cells PX.

Each of the pixel cells PX has the parallelogram shape, so that a line A overlaps with the adjacent pixel cells PX along the second direction D2 and a boundary part BL dividing the pixel cells PX along the line A extended in the second direction D2 with respect to one of the pixel cells PX. When each of the pixel cells PX has the parallelogram shape on a plan view, there is no line connecting only the boundary part BL among the lines extended in the second direction D2.

Accordingly, when the emitting surface 314 of each of the units 310 has the rectangular shape and each of the pixel cells PX has the tetragonal shape in the 3D mode, a moiré that appears in stripes by representing only a boundary part may be minimized by changing the shape of the pixel cells PX. In addition, although each of the pixel cells PX has the parallelogram shape, there is no affect on displaying the 2D image in the 2D mode.

Figure 5:
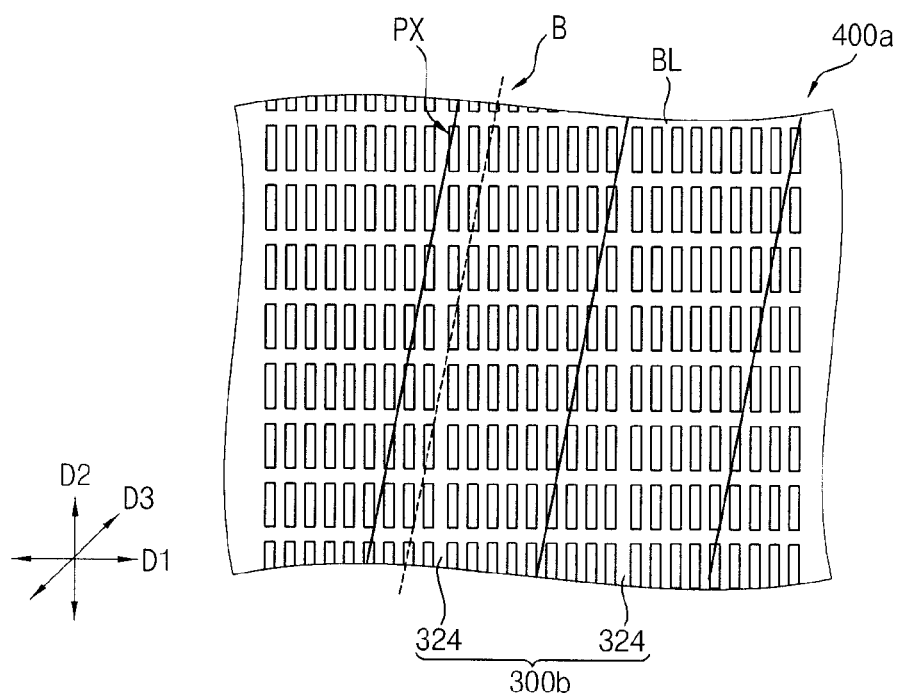
FIG. 5 is a plan view illustrating a display device according to still another exemplary embodiment of the present invention.

FIG. 5 is a plan view illustrating a display device according to still another exemplary embodiment of the present invention.

The display device according to the present exemplary embodiment is substantially the same as the previous exemplary embodiment in FIG. 1, except for an array sheet 300b. Thus, the same reference numerals will be used to refer to the same or like parts as those described in the previous exemplary embodiment in FIG. 1 and any further repetitive explanation concerning the above elements will be omitted and descriptions of an arrangement relation between the display panel 400a and the array sheet 300b will be described.

Referring to FIG. 1 and FIG. 5, the display panel 400a according to the present exemplary embodiment includes the pixel cells PX including a shorter side extended in the first direction D1 and a longer side extended in the second direction D2. Each of the pixel cells PX has the rectangular shape and the pixel cells PX are disposed in the matrix shape along the first direction D1 and the second direction D2.

The array sheet 300b disposed under the display panel 400a includes a plurality of units 310 having an emitting surface 324 corresponding to at least two pixel cells PX. When viewed on a plane, each of the units 310 according the present exemplary embodiment is extended to the third direction D3 inclined with respect to the first direction D1 by a predetermined angle. The third direction D3 may be a direction between the first direction D1 and the second direction D2. For example, the emitting surface 324 is a parallelogram shape. The emitting surface 324 has the parallelogram shape inclined to the third direction D3 and each of the pixel cells PX has the rectangular shape, so that a boundary of the emitting surfaces 324 may partially overlap with the pixel cells PX.

Each of the emitting surfaces 324 has the parallelogram shape, so that a line B overlaps with the adjacent pixel cells PX along the second direction D2 and a boundary part BL dividing the pixel cells PX along the line B extended in the third direction D3 that is an extending direction of the emitting surfaces 324. When each of the emitting surfaces 324 has the parallelogram shape, there is no line connecting only the boundary part BL among the lines extended in the third direction D3.

Accordingly, a moiré generated in the 3D image may be minimized by the array sheet 300b including the units 310 extended to the third direction D3 and disposed in the first direction D1. In addition, changing the shape of the array sheet 300b has no affect on displaying the 2D image in the 2D mode.

Figure 6A:
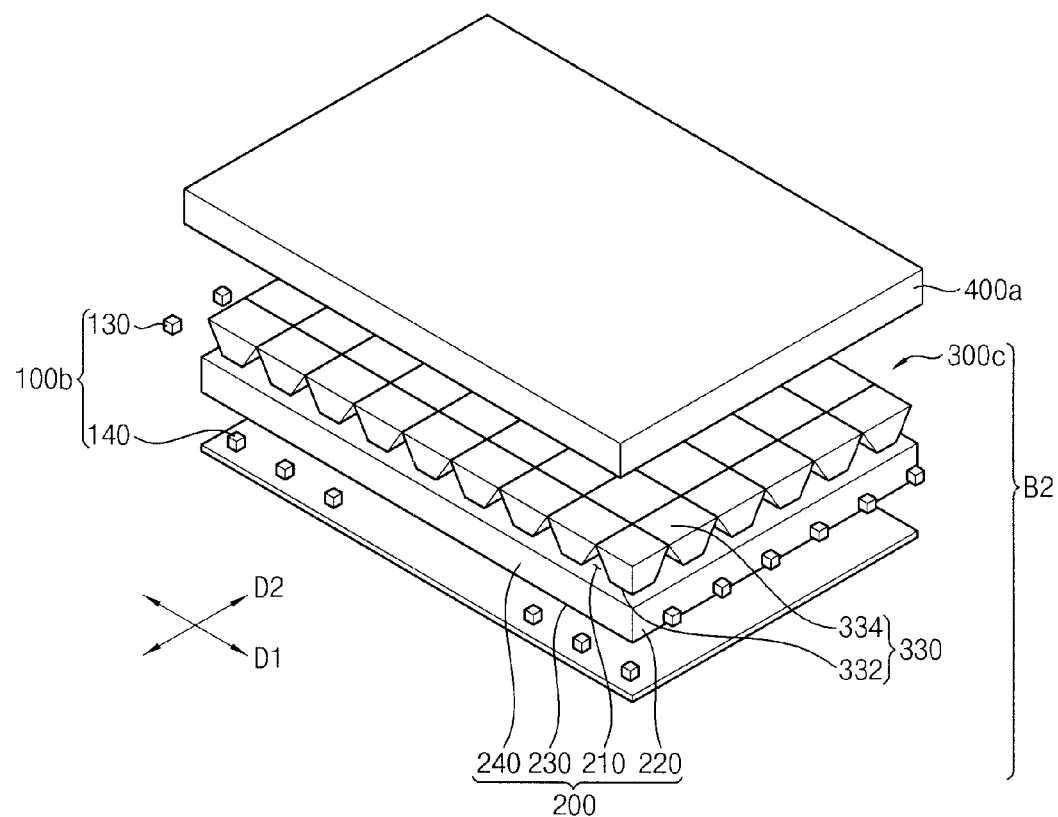
FIG. 6A is an exploded perspective view illustrating a display device according to still another exemplary embodiment of the present invention.

FIG. 6A is an exploded perspective view illustrating a display device according to still another exemplary embodiment of the present invention.

The display device according to the present exemplary embodiment includes a backlight assembly B2 including a light source part 100b, a total reflection plate 200 and an array sheet 300c, and a display panel 400a. The display device according to the present exemplary embodiment is substantially the same as the previous exemplary embodiment in FIG. 1, except for the array sheet 300c and the light source part 100b. Thus, the same reference numerals will be used to refer to the same or like parts as those described in the previous exemplary embodiment in FIG. 1 and any further repetitive explanation concerning the above elements will be omitted.

Referring to FIG. 6A, the light source part 100b includes a third light source 130 disposed as the edge illumination type with respect to the total reflection plate 200 and a fourth light source 140 disposed as the direct illumination type with respect to the total reflection plate 200.

The third light source 130 is disposed to face at least one of the first side surfaces 220 and the second side surfaces 240. The third light source 130 may include a plurality of light emitting diodes (LEDs) disposed at each of the first side surfaces 220 as illustrated in FIG. 6A. Although not shown in the figure, the third light source 130 may additionally include the LEDs disposed at each of the second surfaces 240. Alternatively, the third light source 130 may include the LEDs disposed at one of the first side surfaces 220 and one of the second side surfaces 240. For example, the plurality of the LEDs may be disposed at each of the first side surfaces 220 and the second side surfaces 240, considering an amount of the light, since the LEDs are a kind of a point light source, unlike the linear lamp.

The fourth light source 140 is disposed to face the lower surface 230 of the total reflection plate 200. The fourth light source 140 may include the plurality of the LEDs disposed in a matrix shape in a first direction D1 and a second direction D2 different from the first direction D1 all over the lower surface 230. In the present exemplary embodiment, the first direction D1 is substantially perpendicular to the second direction D2.

In FIG. 6A, the light source part 100b of the display device includes the third light source 130 and the fourth light source 140, however alternatively, the light source part 100b may include the linear lamps like the first light source 110 and the second light source 120 as illustrated in FIG. 1. In addition, it is understood that the first light source 110 and the second light source 120 of the display device illustrated in FIG. 1 may be substituted for the third light source 130 and the fourth light source 140.

In addition, the display panel 400a may be substituted for the display panel 400b illustrated in FIG. 4.

The array sheet 300c includes a plurality of units 330. The units 330 are disposed in a matrix shape along the first direction D1 and the second direction D2. Each of the units 330 may have a square pyramid cone shape. For example, each of the units 330 may have an inverse pyramid shape having a chamfered vertex. Each of the units 330 includes an incident surface 332 making direct contact with the upper surface 210 of the total reflection plate 200 and an emitting surface 334 facing the incident surface 332. The chamfered vertex of the inverse pyramid shape corresponds to the incident surface 332. An area of the emitting surface 334 is greater than that of the incident surface 332. Each of the incident surface 332 and the emitting surface 334 has a tetragonal shape that is defined as a pair of first sides extended in the first direction D1 and a pair of second sides extended in the second direction D2. In the present exemplary embodiment, each of the incident surface 332 and the emitting surface 334 has a regular square shape of which the first sides and the second sides have the same length. A cross-sectional surface taken of each of the units 330 along the first direction D1 has a trapezoid shape, that is, a length of the first side of the emitting surface 334 is greater than a length of the first side of the incident surface 332. The sum of areas of the emitting surfaces 334 may be substantially the same as the area of the display panel 400a.

Figure 6B:
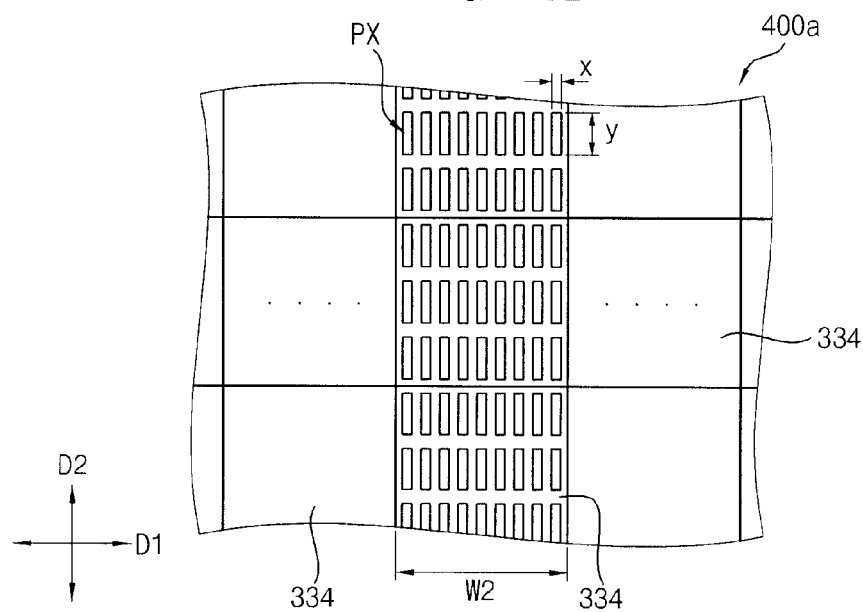
FIG. 6B is a plan view illustrating an arrangement relation between the display panel and the array sheet of FIG. 6A.

FIG. 6B is a plan view illustrating an arrangement relation between the display panel 400a and the array sheet 300c of FIG. 6A Referring to FIG. 6A and FIG. 6B, the display panel 400a includes a plurality of pixel cells PX including a shorter side having a first length x extended in the first direction D1 and a longer side having a second length y extended in the second direction D2. Each of the pixel cells PX has a rectangular shape.

The emitting surface 334 of each of the units 330 is disposed corresponding to at least two pixel cells PX adjacent to each other. The emitting surface 334 may be disposed corresponding to 9 pixel cells PX disposed in the first direction D1. In addition, the emitting surface 334 may be disposed corresponding to 3 pixel cells PX disposed in the second direction D2. The lengths of the first and second sides of each of the units 330 may be from about 200 μm to about 300 μm, respectively.

The pixel cells PX have substantially the same result that divides a plurality of pixel gatherings by the units 330. The pixel cells PX may define the pixel gatherings of the regular square shape according to a shape of the emitting surface 334 of the units 330. According to the exemplary embodiment of the present invention, the light may be provided to the pixel gatherings determining the resolution of the 3D image by using the array sheet 300c as the parallax barrier. Therefore, the amount of the light blocked by the parallax barrier may be minimized, so that the luminance efficiency may be maximized in the barrier type.

The 3D mode and the 2D mode of the display device illustrated in FIG. 6A are substantially the same as those described in FIG. 3A and FIG. 3B, respectively, and thus further repetitive explanation concerning the above elements will be omitted. In the 3D mode of the display device illustrated in FIG. 6A, a third voltage is applied to turn the third light source 130 on, and a fourth voltage is cut off to turn the fourth light source 140 off. In addition, in the 2D mode, the third light source 130 is turned off and the fourth light source 140 is turned on. Therefore, the 3D mode and the 2D mode may be freely and speedily converted.

Although not shown in the figure, the emitting surface 334 of each of the units 330 having the square pyramid cone shape may have a parallelogram shape. In this case, the units 330, each of which has the square pyramid cone shape, may extend in a third direction D3 between the first direction D1 and the second direction D2, and be disposed in the first direction D1 as illustrated in FIG. 5.

Alternatively, each of the units 330 may be varied in shape, such as a trigonal pyramid cone shape, a pentagonal pyramid cone shape, a hexagonal pyramid cone shape, and so on, for example, each varied shape may be inverted and have a chamfered vertex.

Figure 7:
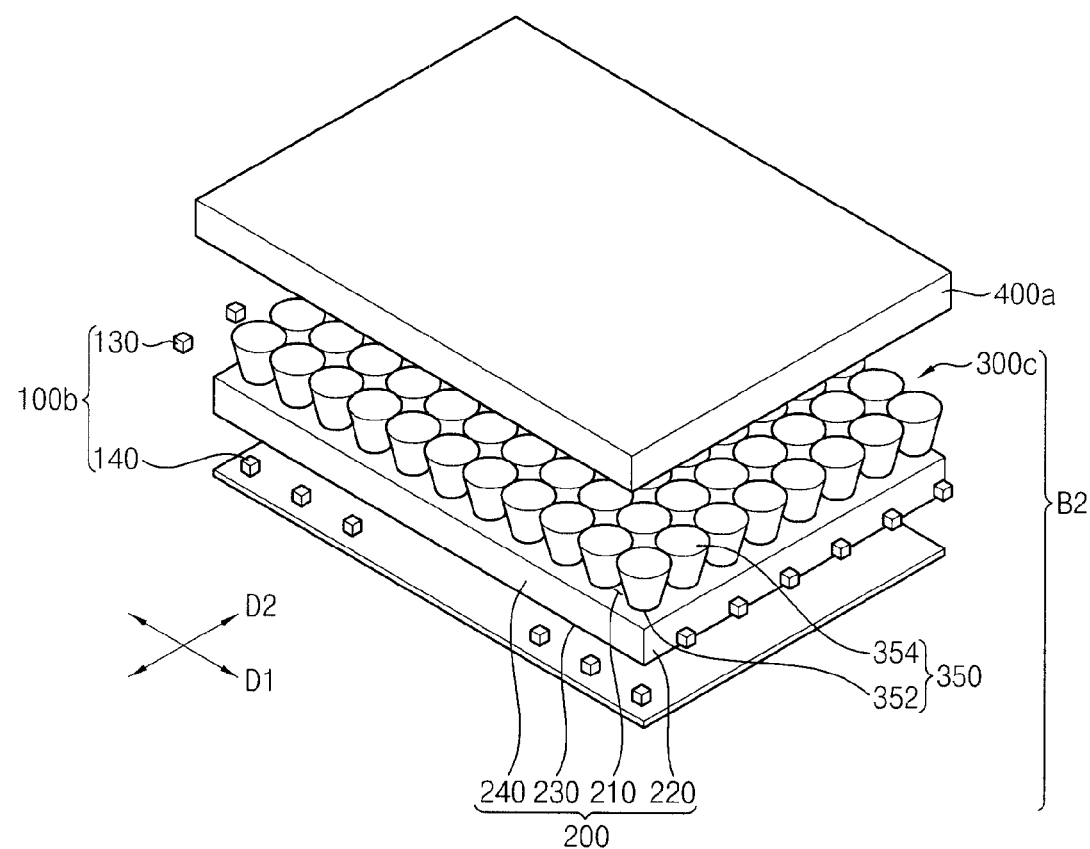
FIG. 7 is an exploded perspective view illustrating a display device according to still another exemplary embodiment of the present invention.

FIG. 7 is an exploded perspective view illustrating a display device according to still another exemplary embodiment of the present invention.

The display device according to the present exemplary embodiment includes a backlight assembly B2 including a light source part 100b, a total reflection plate 200 and an array sheet 300c, and a display panel 400a. The display device according to the present exemplary embodiment is substantially the same as the previous exemplary embodiment in FIG. 6A, except for the array sheet 300c. Thus, the same reference numerals will be used to refer to the same or like parts as those described in the previous exemplary embodiment in FIG. 6A and any further repetitive explanation concerning the above elements will be omitted.

Referring to FIG. 7, the array sheet 300c includes a plurality of units 350. The units 350 are disposed in a matrix in the first direction D1 and the second direction D2. Each of the units 350 may have a truncated cone shape. Each of the units 350 includes an incident surface 352 making direct contact with the upper surface 210 of the total reflection plate 200 and an emitting surface 354 facing the incident surface 352. An area of the emitting surface 354 is greater than that of the incident surface 352. Each of the incident surface 352 and the emitting surface 354 has a round shape. A first diameter of the incident surface 352 is less than a second diameter of the emitting surface 354. A cross-sectional surface taken of each of the units 350 along the first direction D1 has a trapezoid shape, that is, a length of a lower side is less than a length of an upper side.

Figure 8A:
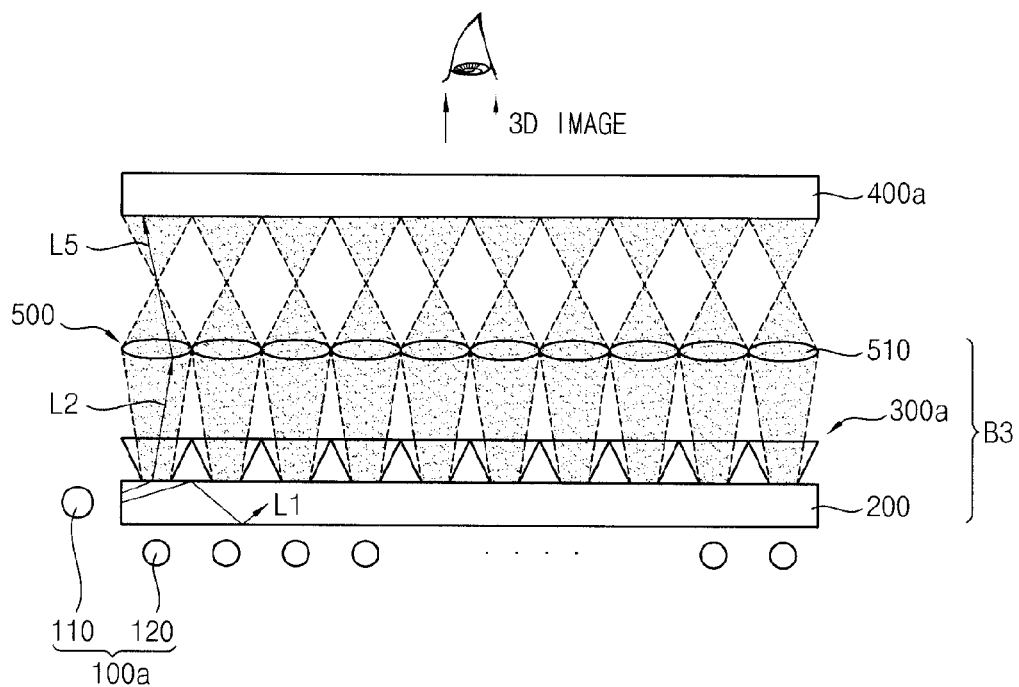
FIG. 8A is a cross-sectional view illustrating a 3D mode of a display device according to still another exemplary embodiment of the present invention and FIG. 8B is a cross-sectional view illustrating a 2D mode thereof.
Figure 8B:
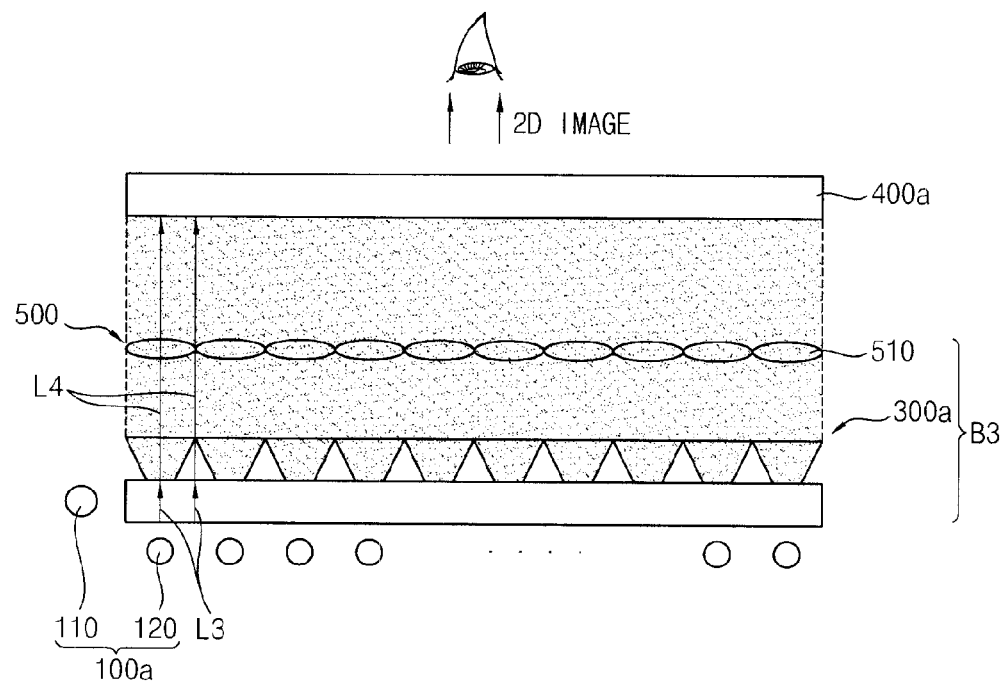

FIG. 8A is a cross-sectional view illustrating a 3D mode of a display device according to still another exemplary embodiment of the present invention, and FIG. 8B is a cross-sectional view illustrating a 2D mode.

The display device of the present exemplary embodiment includes a backlight assembly B3 including a light source part 100a, a total reflection plate 200, an array sheet 300a and a lens sheet 500, and a display panel 400a. The display device of the present exemplary embodiment is substantially the same as the previous exemplary embodiment in FIG. 1, except for the lens sheet 500. Thus, the same reference numerals will be used to refer to the same or like parts as those described in the previous exemplary embodiment in FIG. 1 and any further repetitive explanation concerning the above elements will be omitted.

The lens sheet 500 is disposed between the array sheet 300a and the display panel 400a. The lens sheet 500 includes a plurality of lenses 510. The lenses 510 are disposed at regions corresponding to the units 310 of the array sheet 300a, respectively. The lenses 510 converge the light passing through the array sheet 300a to diverge the light into a region of the display panel 400a corresponding to the units 310. The lens sheet 500 is capable of filtering noise light passing through the array sheet 300a and uniformly providing the light to the display panel 400a.

Referring to FIG. 8A, the total reflection light L1 entering inside of the total reflection plate 200 by the first light source 110 and totally reflected, is refracted at the contact surface CNT making contact with the array sheet 300a and is emitted as the refracted light L2 as described in FIG. 3A. At the noncontact surface NC that does not make contact with the array sheet 300a, the total reflection light L1 is not emitted outside of the total reflection plate 200 and is totally reflected.

The refracted light L2 is emitted toward the lens sheet 500. The lens sheet 500 receives the refracted light L2 having light paths varied according to the refraction angle at the contact surface CNT, converges the refracted light L2 by re-refracting the refracted light L2, and then diverges the refracted light L2 toward the display panel 400a (the diverged light being L5). Therefore, the observer may see the 3D image by the parallax of both eyes, even if the display panel 400a displays the 2D image.

Referring to FIG. 8B, the transmitted light L3 entering inside of the total reflection plate 200 by the second light source 120, is not refracted and/or reflected, is transmitted in the total reflection plate 200 and is emitted as the non-refracted light L4 by passing through the array sheet 300a as described in FIG. 3B. Therefore, the non-refracted light L4 passing through the total reflection plate 200 and the array sheet 300a is not refracted and/or reflected and is provided to the display panel 400a, despite passing through the lens sheet 500. Therefore, the observer may see the 2D image displayed by the display panel 400a as it is, without distortion by the light.

Although not shown in the figure, the display device may add the lens sheet 500 to the display device illustrated in FIG. 6A. In this case, the 2D mode and the 3D mode are substantially the same as the descriptions set forth above with reference to FIG. 8A and FIG. 8B.

Figure 9A:
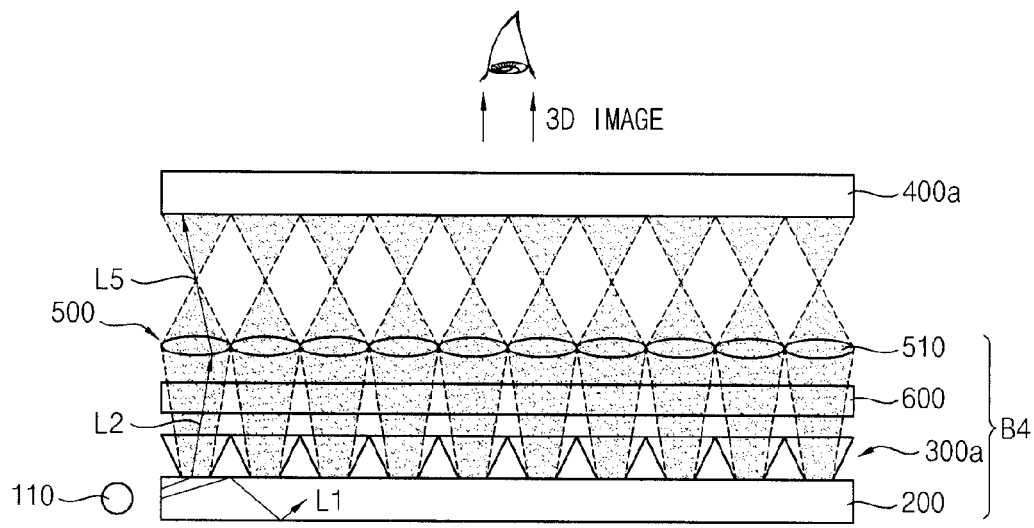
FIG. 9A is a cross-sectional view illustrating a 3D mode of a display device according to still another exemplary embodiment of the present invention and FIG. 9B is a cross-sectional view illustrating a 2D mode thereof.
Figure 9B:
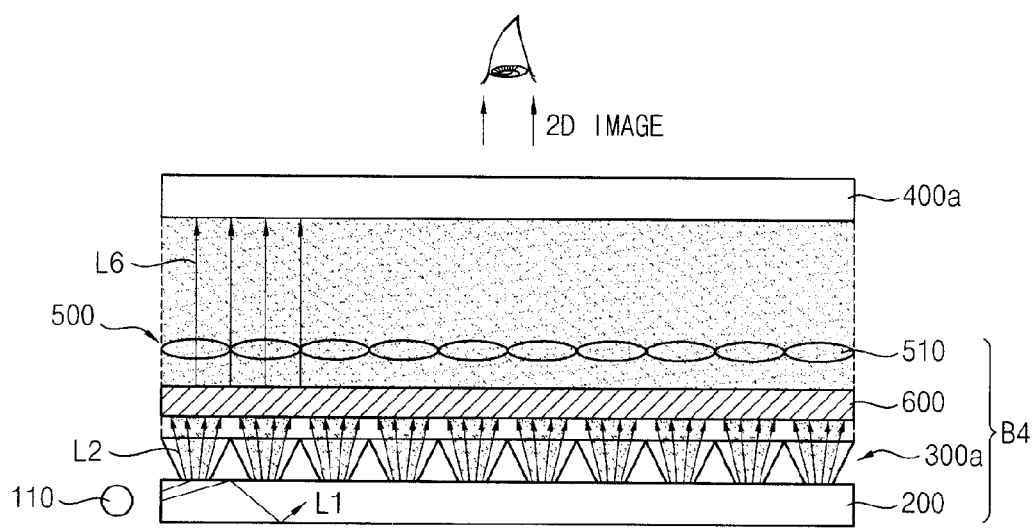

FIG. 9A is a cross-sectional view illustrating a 3D mode of a display device according to still another exemplary embodiment of the present invention, and FIG. 9B is a cross-sectional view illustrating a 2D mode.

The display device according to the present exemplary embodiment includes a backlight assembly B4 including a first light source 110, a total reflection plate 200, an array sheet 300a, a lens sheet 500 and a polymer dispersed liquid crystal (PDLC) film 600, and a display panel 400a. The display device according to the present exemplary embodiment is substantially the same as the previous exemplary embodiment in FIG. 8A and FIG. 8B, except for the first light source 110 and the PDLC film 600. Thus, the same reference numerals will be used to refer to the same or like parts as those described in the previous exemplary embodiment in FIG. 8A and FIG. 8B and any further repetitive explanation concerning the above elements will be omitted.

The display device illustrated in FIG. 9A and FIG. 9B includes the first light source 110 disposed at only side surfaces 220/240 of the total reflection plate 200. The first light source 110 is turned on while driving the display device, regardless of the 2D mode and the 3D mode.

The PDLC film 600 is disposed between the array sheet 300a and the lens sheet 500. The PDLC film 600 may change to a transparent state or an opaque state according to switching. For example, when a fifth voltage is applied to the PDLC film 600, a liquid crystal in the PDLC film 600 is regularly disposed to be the transparent state. When the fifth voltage is cut off to the PDLC film 600, the liquid crystal in the PDLC film 600 is irregularly disposed to diffuse the light provided to inside of the PDLC film 600.

Referring to FIG. 9A, the light generated from the first light source 110 is converted to the refracted light L2 from the total reflection light L1 by passing through the total reflection plate 200 and the array sheet 300a as described in FIG. 8A. The refracted light L2 is emitted to the PDLC film 600. The fifth voltage is applied, so that the PDLC film 600 has the transparent state. Accordingly, the refracted light L2 passes through the PDLC film 600 to emit into the lens sheet 500 without a change of the path. The lens sheet 500 diverges the light passing through the PDLC film 600 toward the display panel 400a (the diverged light L5). Therefore, the observer may see the 3D image by the parallax of both eyes, even if the display panel 400a displays the 2D image.

Referring to FIG. 9B, the first light source 110 is also turned on in the 2D mode, so that the light generated from the first light source 110 passes through the total reflection plate 200 and the array sheet 300a to be converted to the refracted light L2. The refracted light L2 is emitted toward the PDLC film 600 and is provided to the lens sheet 500 as a diffused light L6 of which a path is changed by being diffused in the PDLC film 600 having the opaque state by cutting off the fifth voltage. The diffused light L6 is not refracted and/or reflected and is provided to the display panel 400a, despite passing through the lens sheet 500. Therefore, the observer may see the 2D image displayed by the display panel 400a as it is, without distortion by the light.

The display device according to the present exemplary embodiment may convert the 2D mode into the 3D mode by the PDLC film 600 and the amount of the light blocked by the parallax barrier may be minimized by using the array sheet 300a and the first light source 110.

Figure 10A:
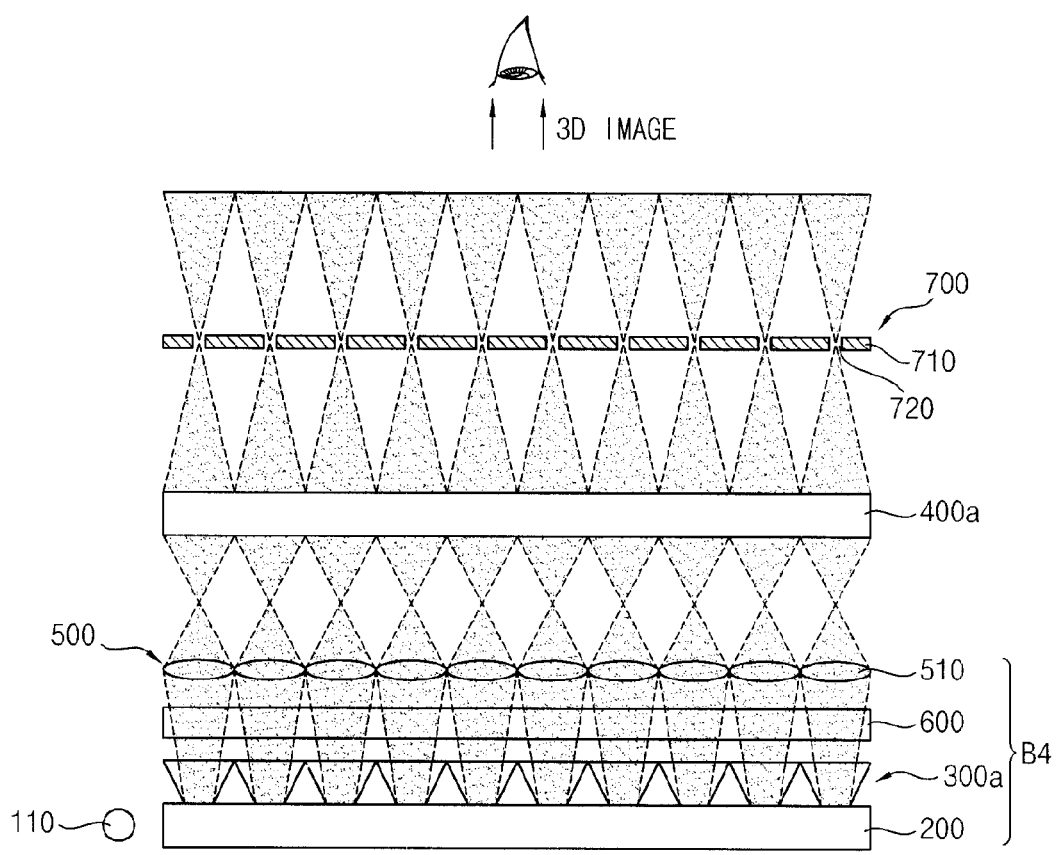
FIG. 10A is a cross-sectional view illustrating a 3D mode of a display device according to still another exemplary embodiment of the present invention and FIG. 10B is a cross-sectional view illustrating a 2D mode thereof.
Figure 10B:
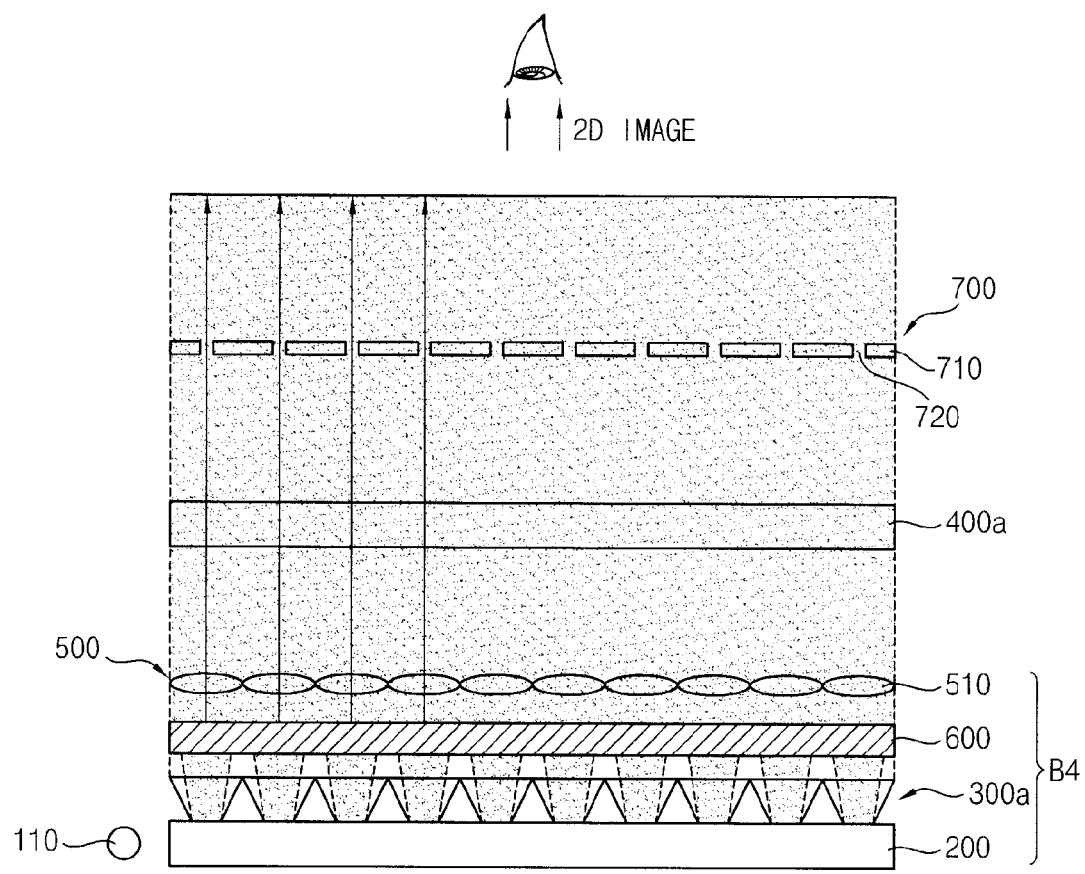

FIG. 10A is a cross-sectional view illustrating a 3D mode of a display device according to still another exemplary embodiment of the present invention, and FIG. 10B is a cross-sectional view illustrating a 2D mode.

The display device according to the present exemplary embodiment includes a backlight assembly B4 including a first light source 110, a total reflection plate 200, an array sheet 300a, a lens sheet 500 and a PDLC film 600, a display panel 400a, and a switchable parallax barrier 700. The display device according to the present exemplary embodiment is substantially the same as the previous exemplary embodiment in FIG. 9A and FIG. 9B, except for the switchable parallax barrier 700. Thus, the same reference numerals will be used to refer to the same or like parts as those described in the previous exemplary embodiment in FIG. 9A and FIG. 9B and any further repetitive explanation concerning the above elements will be omitted.

The switchable parallax barrier 700 is disposed over the display panel 400a. The switchable parallax barrier 700 includes barrier parts 710 capable of converting a transparent state into an opaque state and holes 720 between the adjacent barrier parts 710. When the barrier parts 710 have the opaque state, the observer may see the display panel 400a through the holes 720 from over the switchable parallax barrier 700. In addition, when the barrier parts 710 have the transparent state, the observer may see the display panel 400a through the barrier parts 710 and the holes 720 from over the switchable parallax barrier 700.

Referring to FIG. 10A, the light diverged after converging by the lens sheet 500 is provided to the display panel 400a as described in FIG. 9A. The display panel 400a passes the light provided from the lens sheet 500 as it is. In the 3D mode, the barrier parts 710 have the opaque state, so that the observer may see the light passing through the display panel 400a through only the holes 720. Therefore, the observer may see the 3D image by the parallax of both eyes, even if the display panel 400a displays the 2D image.

Referring to FIG. 10B, the light diffused at the PDLC film 600 is not refracted and/or reflected and is provided to the display panel 400a, despite passing through the lens sheet 500 as described in FIG. 9B. In the 2D mode, the barrier parts 710 have the transparent state, so that all the light passing through the display panel 400a passes through the switchable parallax barrier 700. Therefore, the observer may see the 2D image displayed by the display panel 400a as it is, without distortion by the light.

The display device according to the present exemplary embodiment may convert the 2D mode into the 3D mode by the PDLC film 600 and the switchable parallax barrier 700. By further including the switchable parallax barrier 700, the observer may see the 3D image having clearer and more uniform brightness than without the switchable parallax barrier 700, despite relatively decreasing the luminance.

Although not shown in the figure, the display device illustrated in FIG. 1 and FIG. 6A may further include the PDLC film 600 or/and the switchable parallax barrier 700 according to the exemplary embodiments. In this case, the display device may convert the 2D mode into the 3D mode by the light source part 100a including the light source of the edge illumination type 110/130 and the light source of the direct illumination type 120/140. In addition, for a conversion between the 2D mode and the 3D mode the light source of the direct illumination type 120/140 does not need to be omitted in the display device illustrated in FIG. 1 and FIG. 6A, so that the display device that includes only the 3D image and improves the luminance may be provided.

In addition, although each display device including the array sheet 300a of FIG. 1 is illustrated in FIG. 8A, FIG. 8B, FIG. 9A, FIG. 9B, FIG. 10A and FIG. 10B, the array sheet 300a may be substituted for the array sheet 300b illustrated in FIG. 5 or the array sheet 300c illustrated in FIG. 6A. In addition, where each display device including the display panel 400a of FIG. 2 is illustrated, the display panel 400a may be substituted for the display panel 400b illustrated in FIG. 4. In addition, where each display device including the first light source 110 or the second light source 120 of the linear lamp of FIG. 1 is illustrated, the first light source 110 or the second light source 120 may be substituted for the LEDs illustrated in FIG. 6A.

The backlight assembly and the display device having the backlight assembly according to the present invention may be used for displaying only the 3D mode and may be also used for the 2D/3D convertible mode. Moreover, the display device according to the present invention may be applied to a liquid crystal display (LCD) device as well as a portable display device, a plasma display panel (PDP) device, a flat panel display device, a 3D game player, a 3D television (TV), a military 3D display, a training 3D display for a simulation, a medical 3D display, and so on.

According to exemplary embodiments of the present invention, a barrier type may have luminance as much as the luminance of a lenticular type. In addition, in a 2D/3D switchable display device, a 3D mode may display a 3D image with the luminance as great as the luminance in a 2D mode. Thus, display quality of the 3D image may be enhanced by improving the luminance of the 2D/3D switchable display device.

The foregoing is illustrative of the present invention and is not to be construed as limiting thereof. Although a few exemplary embodiments of the present invention have been described, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight assembly, comprising:
a total reflection plate having an upper surface, a lower surface, and a side surface, the total reflection plate configured to selectively totally internally reflect light incident to the side surface and to transmit light incident on the lower surface to the upper surface;
a first light source to emit the light incident to the side surface;
a second light source to emit the light incident to the lower surface; and
an array sheet disposed on the total reflection plate, comprising a plurality of units each having an incident surface making contact with the total reflection plate and an emitting surface facing the incident surface, each unit to refract the totally internally reflected light at a contact surface between the incident surface and the total reflection plate, to emit the refracted light, and to emit the transmitted light as a non-refracted light,
wherein the refracted light is configured to form a 3D stereoscopic image and the transmitted light is configured to form a 2D image.

2. The backlight assembly of claim 1, wherein the light is incident on the side surface of the total reflection plate and the array sheet emits the refracted light refracted at the contact surface, when the first light source is turned on and the second light source is turned off,
and the light is incident on the lower surface of the total reflection plate and the array sheet emits the non-refracted light transmitted to the total reflection plate, when the first light source is turned off and the second light source is turned on.

3. The backlight assembly of claim 1, further comprising a lens sheet comprising a plurality of lenses respectively corresponding to the plurality of units, disposed over the array sheet to re-refract the refracted light and to transmit the non-refracted light.

4. The backlight assembly of claim 1, wherein each of the units has a trapezoidal prism shape or a conical frustum shape, and the area of the emitting surface thereof is greater than the area of the incident surface thereof.

5. The backlight assembly of claim 1, wherein each of the units comprises a prism shape and the area of the emitting surface thereof is greater than the area of the incident surface thereof.

6. A display device, comprising:
a display panel comprising a plurality of pixel cells;
a total reflection plate disposed under the display panel and having an upper surface, a lower surface, and side surface, the total reflection plate being configured to totally internally reflect light incident to the side surface and to transmit light incident to the lower surface;
a first light source to emit the light incident to the side surface;
a second light source to emit the light incident to the lower surface; and
an array sheet disposed on the total reflection plate, comprising a plurality of units each comprising an incident surface making contact with the total reflection plate and an emitting surface facing the incident surface, each unit to refract the internally total-reflected light at a contact surface between the incident surface and the total reflection plate, to emit the refracted light, and to emit the transmitted light as a non-refracted light,
wherein the display device is configured to convert the refracted light into a 3D stereoscopic image and is configured to convert the transmitted light into a 2D image.

7. The display device of claim 6, wherein the light is incident on the side surface of the total reflection plate and the array sheet emits the refracted light refracted at the contact surface, when the first light source is turned on and the second light source is turned off.

8. The display device of claim 6, wherein the light is incident on the lower surface of the total reflection plate and the array sheet emits the non-refracted light transmitted to the total reflection plate, when the first light source is turned off and the second light source is turned on.

9. The display device of claim 6, wherein the first light source comprises two light sources disposed on opposing portions of the side surface of the total reflection plate.

10. The display device of claim 9, further comprising a polymer dispersed liquid crystal (PDLC) film disposed between the array sheet and the display panel, and operable to selectively transmit or diffuse the refracted light emitted from the array sheet.

11. The display device of claim 6, further comprising a switchable parallax barrier disposed over the display panel, comprising a plurality of holes each corresponding to a respective one of the plurality of units, wherein the switchable parallax barrier is operable to change between a transparent state and an opaque state according to an applied voltage.

12. The display device of claim 6, further comprising a lens sheet disposed between the array sheet and the display panel, comprising a plurality of lenses respectively corresponding to the plurality of units, to re-refract the refracted light, and to transmit the non-refracted light.

13. The display device of claim 6, wherein each of the units comprises a prism shape comprising an area of the emitting surface greater than that of the incident surface.

14. The display device of claim 13, wherein the units are arranged in parallel with one another in a first direction of the display panel.

15. The display device of claim 6, wherein each of the units comprises a square pyramid cone shape or a truncated cone shape that comprises an area of the emitting surface greater than that of the incident surface.

16. The display device of claim 15, wherein the plurality of units are arranged in a matrix shape in a first direction of the display panel and in a second direction substantially perpendicular to the first direction.

17. The display device of claim 6, wherein each of the units overlaps with more than two pixel cells adjacent to each other.

18. The display device of claim 6, wherein the sum of areas of the emitting surfaces of the plurality of units is substantially the same as the area of the display panel.

* * * * *